United States Patent
Nguyen et al.

(10) Patent No.: US 10,034,191 B2
(45) Date of Patent: Jul. 24, 2018

(54) AMBIGUITY RESOLUTION IN POSITIONING MEASUREMENTS

(71) Applicant: Sequans Communications S.A., Colombes (FR)

(72) Inventors: Van Minh Nguyen, Colombes (FR); Moussa Abdi, Colombes (FR); Alain Kouioumdjian, Colombes (FR); Aymane Hamahmy, Colombes (FR); Imran Latif, Colombes (FR); Serdar Sezginer, Colombes (FR)

(73) Assignee: SEQUANS COMMUNICATIONS S.A., Colombes (FR)

( * ) Notice: Subject to any disclaimer, the term of this patent is extended or adjusted under 35 U.S.C. 154(b) by 78 days.

(21) Appl. No.: 15/191,263

(22) Filed: Jun. 23, 2016

(65) Prior Publication Data

US 2016/0381592 A1    Dec. 29, 2016

(30) Foreign Application Priority Data

Jun. 26, 2015  (EP) ..................................... 15306019

(51) Int. Cl.
    *H04W 24/10*    (2009.01)
    *G01S 1/22*     (2006.01)
    (Continued)

(52) U.S. Cl.
    CPC ............... *H04W 24/10* (2013.01); *G01S 1/22* (2013.01); *G01S 5/10* (2013.01); *H04L 5/0007* (2013.01);
    (Continued)

(58) Field of Classification Search
    CPC .... H04W 24/10; H04L 5/0048; H04L 5/0007; H04L 27/2686; H04L 27/2672;
    (Continued)

(56) References Cited

U.S. PATENT DOCUMENTS

| 2007/0076589 A1 | 4/2007 | Stapler |
| 2012/0020437 A1 | 1/2012 | Furudate |

(Continued)

FOREIGN PATENT DOCUMENTS

| EP | 2 833 563 A2 | 2/2015 |
| WO | WO 2011/160697 | 12/2011 |

OTHER PUBLICATIONS

E.A. Sourour, et al., "Frequency Domain Synchronization and Cell Search in 3GPP LTE Systems," 2015 International Conference on Computing, Networking and Communications (ICNC), Workshop on Computing, Networking and Communications (CNC), pp. 341-345 (2015).

(Continued)

*Primary Examiner* — Thai Nguyen
(74) *Attorney, Agent, or Firm* — Hamilton, Brook, Smith & Reynolds, P.C.

(57) ABSTRACT

A computer implemented method of providing RSTD data comprising receiving an uncertainty window centered around an expected RSTD value, determining the PDP of each reference OFDM symbol within the uncertainty window, obtaining a main PDP by calculating a parameter indicative of signal quality for each determined PDP, the main PDP having the highest signal quality, obtaining a preceding PDP of the Main PDP, obtaining a succeeding PDP of the Main PDP, determining PDP metrics comprising, determining a channel metric for each of the main, preceding and succeeding PDPs, determining a channel main tap for each of the main, preceding and succeeding PDPs, determining a delay estimate for each of the main, preceding and succeeding PDPs, wherein if the main PDP is a combined PDP, performing coherence testing on the PDP metrics to detect any ambiguity in the delay estimate of the main PDP, and correcting any ambiguity.

15 Claims, 6 Drawing Sheets

(51) Int. Cl.
*G01S 5/10* (2006.01)
*H04L 27/26* (2006.01)
*H04L 5/00* (2006.01)

(52) U.S. Cl.
CPC ........ *H04L 5/0048* (2013.01); *H04L 27/2662* (2013.01); *H04L 27/2672* (2013.01); *H04L 27/2675* (2013.01); *H04L 27/2686* (2013.01)

(58) Field of Classification Search
CPC ... H04L 27/2662; H04L 27/2675; G01S 1/22; G01S 5/10
See application file for complete search history.

(56) References Cited

U.S. PATENT DOCUMENTS

| | | |
|---|---|---|
| 2013/0315320 A1 | 11/2013 | McGowan |
| 2013/0336133 A1 | 12/2013 | Carbonelli |
| 2015/0018010 A1 | 1/2015 | Fischer |
| 2015/0215884 A1* | 7/2015 | Horvat .................. G01S 5/0294 370/328 |
| 2016/0192398 A1* | 6/2016 | Wang ................ H04W 74/0833 370/329 |
| 2016/0316445 A1* | 10/2016 | Abdi ................... H04L 27/2665 |

OTHER PUBLICATIONS

European Search Report for EP Application No. 15306019.9, dated Dec. 23, 2015.
QualComm Incorporated, "Updates OTDOA Link-Level Results for Synchronous Case," 3GPP Draft, (2010).
Liu, J., et al., "Enhanced RSTD for Scalable Bandwidth of OTDOA Positioning in 3GPP LTE," International Conference on Localon and GNSS, IEEE, (2013).

* cited by examiner

AMBIGUITY RESOLUTION IN POSITIONING MEASUREMENTS

RELATED APPLICATION

This application claims priority under 35 U.S.C. § 119 or 365 to European Application No. 15306019.9, filed Jun. 26, 2015. The entire teachings of the above application are incorporated herein by reference.

TECHNICAL FIELD

This invention relates to ambiguity resolution in positioning measurements. It is particularly suitable for frequency domain implementation of OTDOA measurements in an LTE network.

BACKGROUND

The Observed Time Difference of Arrival (OTDOA) feature was introduced in the LTE R9 standard as a user equipment (UE)-assisted positioning method. It comprises estimating the location of a UE by using the positioning reference signal arrival times that the UE measures from a number of surrounding eNodeBs.

A UE is provided with a list of cells by the location server of a cellular network to measure the relative arrival time with respect to a pre-configured cell (most often the serving cell). The relative arrival time is referred to as reference signal time difference (RSTD), and the pre-configured cell is referred to as the reference cell. Each cell in the list is associated with a priori information on its RSTD. This information is composed of an expected RSTD, which is estimated by the network, and an uncertainty window centered around the expected RSTD value which helps the UE to localize its search in the uncertainty window only.

The network, or precisely the location server, will use the set of RSTDs measured by the UE to obtain the final estimate of the UE position. Therefore, the quality of this positioning method depends closely on the accuracy of the RSTD measurement performed by the UE.

The UE measures RSTD using the Positioning Reference Signal (PRS) that is transmitted on antenna port (AP) 6 of a measured cell. As per standard specification, the size of the uncertainty window can be 2×3069 Ts and the expected RSTD can be 3×8192 Ts (approximately 11 OFDM symbols). Therefore, it is common for the PRS subframe of a measured cell not to be aligned in time with that of the reference cell. Common reasons for such a misalignment include high distance between the serving and measured eNodeB, or asynchronous operation.

Since frequency-domain subframe-based processing is the reference baseband processing used in LTE, a frequency-domain implementation should be less complex than a time-domain approach for RSTD estimation by the UE.

Typically, the underlying baseband processing is synchronized with the serving cell. Keeping the same data path, the frequency-domain data is only available per useful part of an OFDM symbol (i.e. without the cyclic prefix) aligned in time with the serving cell. Thus, a frequency-domain implementation of OTDOA measurement typically includes the following parts:

1. Determine the reference OFDM symbol that corresponds best to the positioning symbol of a measured cell by using an estimation technique,
2. Descramble the selected reference OFDM symbol with the scrambling sequence that is used for PRS of the measured cell,
3. Estimate the PRS arrival time of the measured cell, for example by using an IFFT transform of the resulting descrambled frequency-domain data.

A problem of frequency-domain implementation is that each OFDM symbol can only cover a maximum timing range of 2048 Ts. This is due to the fact that in the frequency domain the timing measure is circular so that we can only get a time measure modulo 2048 Ts which is the FFT size (to enable frequency-domain processing as would be understood).

Taking the following example to illustrate the limiting range, in FIG. 1, a measured cell's positioning symbol is assumed to be in different locations with respect to the reference OFDM symbol n: 1024 Ts earlier in example (a); perfectly aligned in example (b); 1023 Ts later in example (c); and (1023+τ)Ts later in example (d).

For ease of explanation, it is assumed that the channel is composed of only one tap. Then, the power-delay profile (PDP) obtained from the reference OFDM symbol n is as in FIG. 2 where the channel tap position of each corresponding case in FIG. 1 is given.

Since the measured delay is cyclic and only measured modulo 2048 Ts, and with the range covered by a window, for example [0, 2048 Ts], or [−1024 Ts, 1023 Ts], a delay not falling in this range will be estimated wrongly, i.e. with an error that is a multiple of 2048 Ts. In the example of FIG. 2, the covered range is [−1024 Ts, 1023 Ts]. To measure a delay that is greater than 1023 Ts, (position (d)), there will be a systematic error.

Moreover, by convention, if only timings in [−1024 Ts, 1023 Ts] are measured, the FFT window is represented by inverting its left and right halves so that the 0 Ts delay appears to be in the center of the FFT window. This representation is used in FIG. 2. With this convention, any delay in [1024, 2048] is located in the left half of the window, see (d) in FIG. 2. The positions of (a), (b), (c), and (d) inside FIG. 2 are given using these conventions.

For instance, the positioning symbol at (b) results in a channel tap at delay 0 Ts. At position (d), the channel tap appears in the negative part of the PDP at position (τ−1)Ts from −1024 Ts due to phase wrapping. This situation shows the fact that it is ambiguous whether channel tap in the resulting PDP corresponds to a real negative delay or a wrapping positive delay. Similarly, there is the same issue the other way round, where a signal having a real negative delay of (−1024−τ)$T_s$ will appear as having a wrapped delay of (1023−τ)$T_s$.

In relation to position (d) in FIG. 1, for τ>CP/2, reference OFDM symbol n+1 (10) contains the positioning symbol better than reference OFDM symbol n (11) does. In this case, symbol n+1 is preferably selected as the best symbol for the positioning symbol. However, estimation imperfection as well as noise effect may result in reference symbol n but not reference symbol n+1 as the selected symbol. This effect of imperfect symbol selection adds another source of ambiguity in the RSTD estimate.

The above examples can be generalized to show that a frequency-domain implementation faces ambiguity regions as illustrated in FIG. 3. Essentially, ambiguity systematically occurs in the regions (30, 31) where the real delay exceeds the range of each PDP.

The aforementioned ambiguity regions are inherent to the limiting timing range of the PDP obtained from one reference OFDM symbol. Could this ambiguity problem be avoided by using a PDP that is computed from a combination of several reference OFDM symbols instead of from only one?

Let us briefly describe some (but not all) types of combinations to see what combination means. Take example (c) of FIG. 1, the data of the positioning symbol is partially captured in reference OFDM symbols n and n+1. A possible way to proceed is to firstly construct the data of the positioning symbol by coherently combining the frequency-domain data of reference symbols n and n+1 taking into account phase different between the two symbols, and then compute the PDP from this resulting combined frequency-domain data. Another possibility is to combine the two data sets output from IFFT of each reference symbol n and symbol n+1, and then combine these two data sets either by complex value combination or by power combination in order to get a combined PDP at the end.

For such a combined PDP, it is beneficial but not essential to define its timing range as [0,2047], as shown in FIG. 4, to express the fact that the positioning symbol is supposedly laying in between reference symbols n and n+1.

In light of the above, ambiguity still occurs even with a combined PDP. Let us consider combined PDP obtained from reference OFDM symbols n and n+1 as in FIG. 4. Here, position (b) of the positioning symbol in FIG. 1 results in channel tap at position 0 Ts, and position (d) results in channel tap at position (1023+τ)Ts. Similarly, we have channel tap at position 1023 Ts for position (c). On the contrary, position (a) of the positioning symbol results in wrapping channel tap at position 2047−1024=1023 Ts, i.e. it is identical to position (c). This shows that ambiguity of the delay estimate can still occur.

It can be generalized to show that the PDP obtained from the symbol combined from reference symbols n and n+1 has ambiguity regions as shown in FIG. 5.

As a consequence, ambiguity is an issue of the frequency-domain approach.

In a typical frequency-domain implementation of OTDOA receiver, PRS pilot tones corresponding to each eNodeB are extracted in the frequency domain, descrambled and transformed back into time domain on an OFDM symbol basis. Then, accumulation or interpolation of the time domain symbols is performed for all PRS-carrying symbols of a particular subframe to obtain one power delay profile on which timing estimation will be done. The operations of interpolation/accumulation and iFFT may be inverted i.e. carried out in a different order. Then a UE search window is placed around the highest correlation value for the search of the first channel path.

However, all frequency-domain implementations proposed so far have only considered small uncertainty range for which the ambiguity issue is not addressed, whereas time-domain implementations allow performance gain but are known to be computationally more costly.

Accordingly, there is a need to provide a method for ambiguity resolution of RSTD estimation in a frequency-domain implementation of OTDOA measurements in an LTE network.

SUMMARY

According to a first aspect there is provided a method as defined in claim 1 of the appended claims. Thus there is provided a computer implemented method of providing RSTD data comprising:
receiving an uncertainty window centered around an expected RSTD value, determining the PDP of each reference OFDM symbol within the uncertainty window, obtaining a main PDP by calculating a parameter indicative of signal quality for each determined PDP, the main PDP having the highest signal quality, obtaining a preceding PDP of the Main PDP, obtaining a succeeding PDP of the Main PDP, determining PDP metrics comprising:
determining a channel metric for each of the main, preceding and succeeding PDPs, determining a channel main tap for each of the main, preceding and succeeding PDPs, determining a delay estimate for each of the main, preceding and succeeding PDPs, and wherein if the main PDP is a combined PDP, performing coherence testing on the PDP metrics to detect any ambiguity in the delay estimate of the main PDP, and correcting any ambiguity.

Optionally, the method wherein the signal quality is indicative of whether a respective reference OFDM symbol contains positioning data of a measured cell.

Optionally, the method wherein the PDPs comprise combined PDPs.

Optionally, the method wherein combined PDPs are obtained by at least one of coherently combining frequency-domain data; or combining two data sets output from an IFFT of each reference OFDM symbol by complex value combination or power combination.

Optionally, the method wherein if the main PDP is a combined PDP, coherence testing is performed on the PDP metrics and delays to detect any ambiguity in delay estimate of the main PDP, and any ambiguity is corrected.

Optionally, the method wherein the PDPS are calculated from at least one of a positioning symbol, a positioning subframe, a predetermined positioning frame, a positioning occasion.

Optionally, the method wherein ambiguity is corrected by adding an FFT size delay to the delay estimate of the main PDP if:
the delay estimate of the main PDP plus the FFT size delay minus the delay estimate of the succeeding PDP is less than or equal to a matching threshold, where the value to be compared to the matching threshold is taken as an absolute value; and
the result of a two variable function having channel metric of the preceding PDP as a first argument and channel metric of the succeeding PDP as a second argument is higher than a second threshold.

Optionally, the method wherein ambiguity is corrected by subtracting an FFT size delay from the delay estimate of the main PDP if:
the delay estimate of the main PDP minus the FFT size delay minus the delay estimate of the preceding PDP is less than or equal to a matching threshold, where the value to be compared to the threshold is taken as an absolute value; and
the result of a two variable function having channel metric of the succeeding PDP as a first argument and channel metric of the preceding PDP as a second argument is higher than a second threshold.

Optionally, the FFT size delay is equivalent to the FFT window size.

Optionally, the method wherein the RSTD is measured using PRS.

Optionally, the method wherein the uncertainty window is longer than the FFT window used for frequency domain processing.

Optionally, the method wherein correlation with an incoming pilot sequence is executed in the frequency domain.

Optionally, the method further comprising determining a set of consecutive FFT windows for processing in the frequency domain.

Optionally, the method further comprising determining an RSTD estimate based on the delay estimate of the main PDP.

Optionally, the method wherein if the main PDP is a combined PDP the performing step is executed.

According to a second aspect there is provided an apparatus as defined in claim 14.

Optionally, the apparatus may comprise a mobile device. Optionally the apparatus may comprise a UE. Optionally the apparatus may comprise a processor.

According to a third aspect there is provided a computer readable medium as defined in claim 15.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

OVERVIEW

Figure 1:
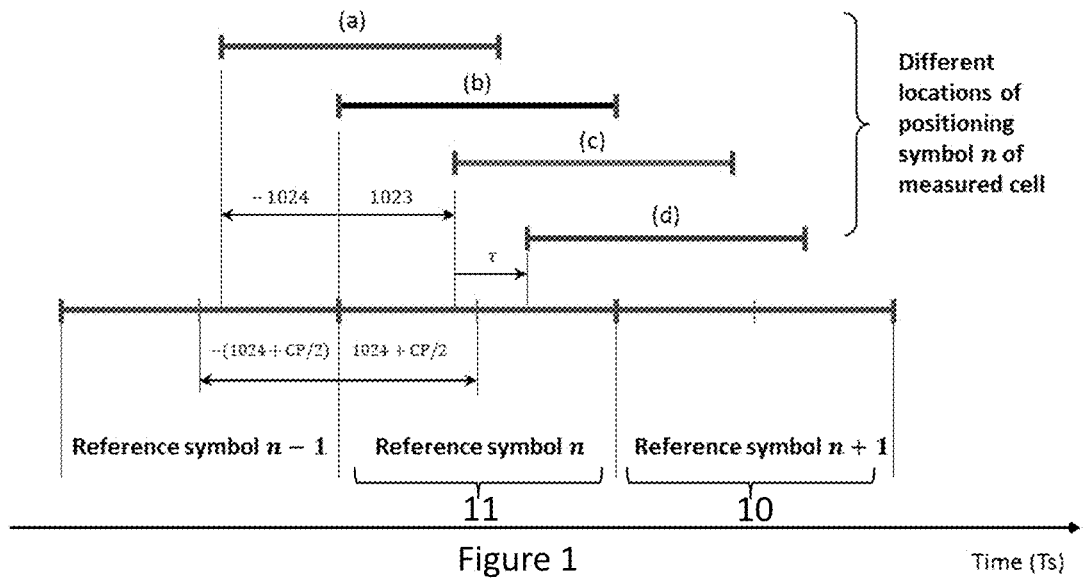
FIG. 1 illustrates examples of positioning symbol location of a measured cell.
Figure 2:
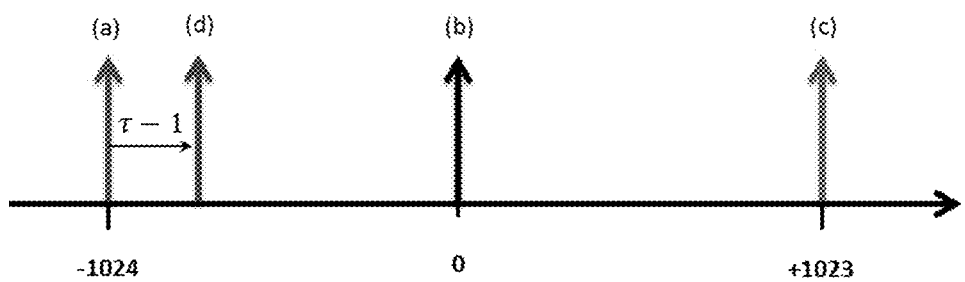
FIG. 2 illustrates channel tap position in the power-delay profile obtained from reference OFDM symbol n.
Figure 3:
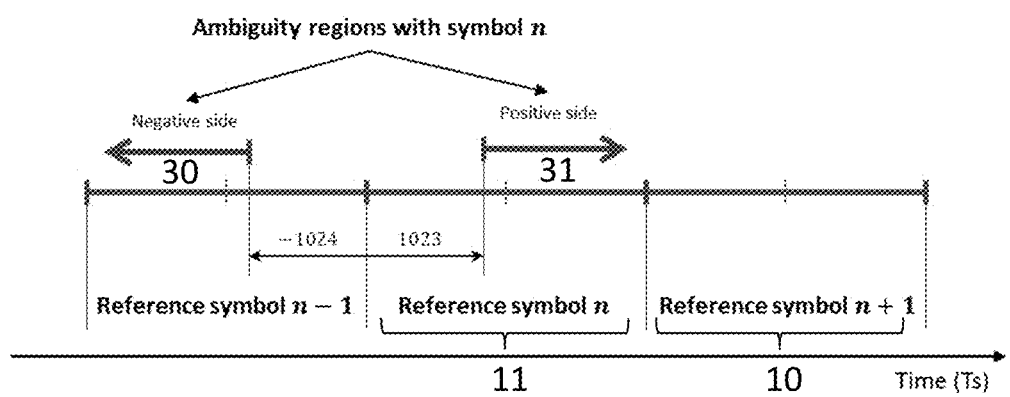
FIG. 3 illustrates an ambiguity region with reference OFDM symbol n.

The disclosed embodiments comprise detecting and correcting ambiguity of a timing estimate obtained from a main power-delay profile (PDP).

By 'main PDP', we define a PDP that is selected as the best between all possible candidate PDPs for RSTD estimation, and for which ambiguity may be present. To select the best PDP, a metric is chosen that is representative of the signal quality (for example peak power of the PDP, or peak SNR on the PDP). The PDP having the maximum metric is chosen.

Note, however, that:

The method is not limited to any possible extension on how a PDP is computed from frequency-domain data, for instance a PDP can be obtained from a positioning symbol, or from a positioning subframe, or from a predetermined (given) positioning frame, or from a positioning occasion.

For the sake of simplicity, in the following, we consider that a PDP is computed from a positioning subframe, however no change is required if the PDP is calculated by a different method.

The proposed method is not limited to any specific method for determining the possible candidate PDPs from the provided uncertainty window.

Also, the proposed method is not limited to any specific way of electing the main PDP from all possible candidate PDPs. The main PDP is chosen that has the maximum metric, where the metric is a quantity proportional to how much the considered OFDM symbol contains the positioning data of the measured cell.

In summary, the method comprises
1. Retrieving the PDP that immediately precedes the main PDP, this is defined as the 'preceding PDP'.
2. Retrieving the PDP that immediately succeeds the main PDP, this is defined as the 'succeeding PDP'.
3. Estimating metrics from each PDP,
4. Performing coherent testing on the estimated metrics to detect ambiguity,
5. Correcting ambiguity.

The resulting method provides Robustness against channel conditions (channel profile, SNR) over the maximum range of standardized uncertainty. (It is noted that, as per LTE standard specification, the size of the uncertainty window can be 2×3069 Ts).

Implementation independent of the underlying frequency-implementation, e.g. with or without different types of combination, and flexible channel metrics.

Low complexity and processing overhead. The proposed ambiguity resolution only adds a few calculations for coherence testing based on existing computations of a typical frequency-domain implementation (e.g. IFFT). These calculations are negligible in comparison to existing computations. The computational overhead is therefore negligible.

DETAILED DESCRIPTION

Throughout this specification, the following definitions apply:

Definitions

Original PDP and Combined PDP

A PDP can be directly computed from a single reference OFDM symbol, or from a combination of several reference OFDM symbols through a combination technique as previously described in relation to FIGS. 1 to 4.

The proposed method is not limited to whether the underlying frequency-domain implementation uses any specific combination or not. For completeness, we describe the proposed method both with and without combination.

Throughout this specification, a PDP is defined as 'original PDP' when it is computed from a single OFDM symbol. $PDP_n$ denotes the original PDP obtained from reference OFDM symbol n.

Figure 4:
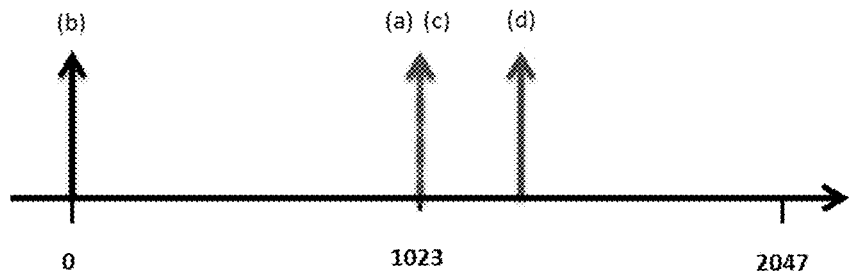
FIG. 4 illustrates channel tap position in the power-delay profile obtained from an OFDM symbol that is combined from reference symbol n and symbol n+1.
Figure 5:
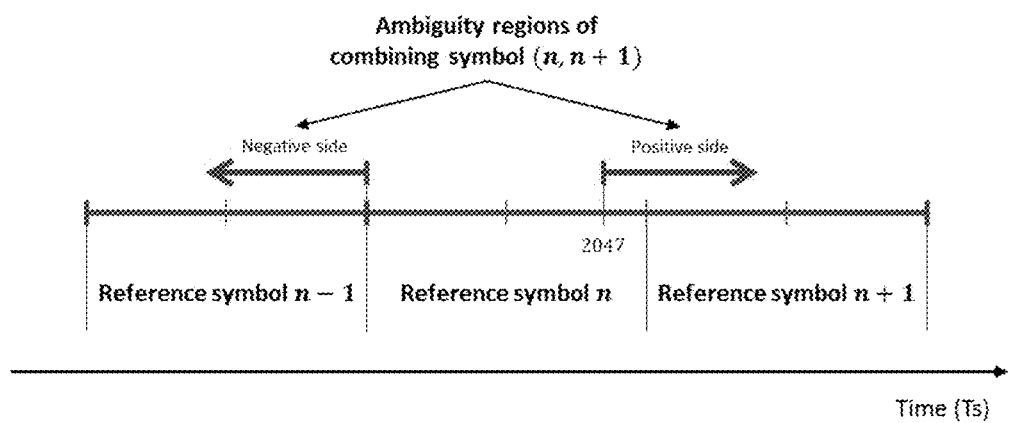
FIG. 5 illustrates ambiguity regions with a symbol combined from symbol n and symbol n+1.

A PDP is defined as 'combined PDP' when a combination is applied and the combined PDP is obtained from a combination of several OFDM symbols. $PDP_{(n,n+1)}$ denotes the combined PDP obtained from reference OFDM symbols n and n+1. FIG. 4 shows an example.

Figure 6:
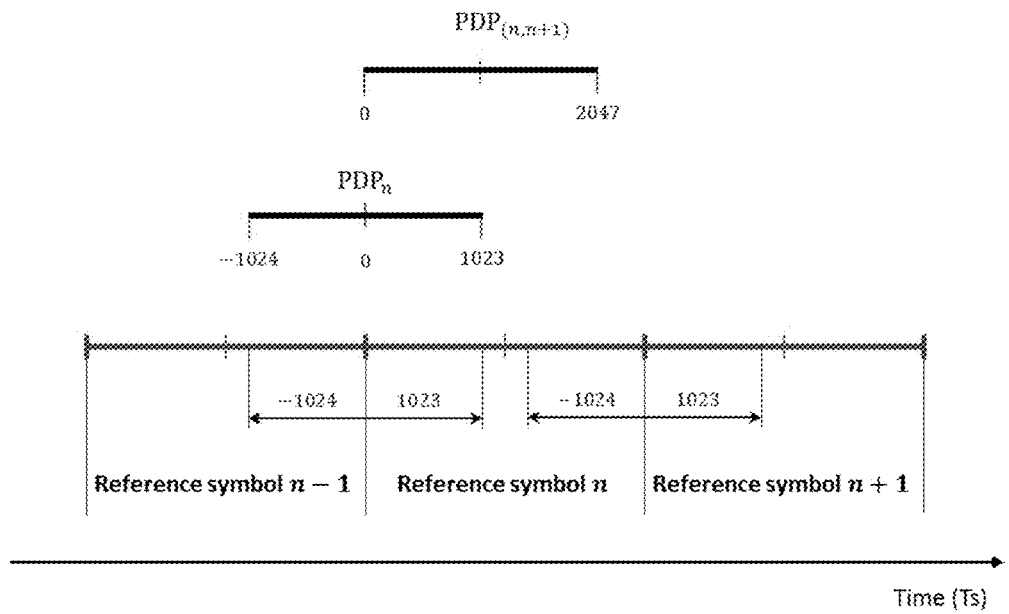
FIG. 6 illustrates the timing range of an original PDP and a combined PDP.

FIG. 6 shows examples where PDP is an original PDP obtained from the reference OFDM symbol n, and $PDP_{(n,n+1)}$ is a combined PDP of symbols n and n+1.

By convention, the timing range of an original PDP is [−1024, 1023], and of a combined PDP is [0, 2047] with the origin as shown in FIG. 6.

Preceding PDP and Succeeding PDP

When combination is NOT applied:

The preceding PDP of original PDP is defined as original $PDP_{n-1}$.

The succeeding PDP of original PDP is defined as original $PDP_{n+1}$.

When combination is applied:

The preceding PDP of original PDP is defined as the combined $PDP_{(n-1,n)}$.

The succeeding PDP of original PDP is defined as the combined $PDP_{(n,n+1)}$.

The preceding PDP of combined $PDP_{(n,n+1)}$ is defined as original $PDP_n$.

The succeeding PDP of combined $PDP_{(n,n+1)}$ is defined as original $PDP_{n+1}$.

Metric Estimation

For each PDP (the main, the preceding, and the succeeding PDPs), the following is calculated:

Channel metric: this may be channel power, channel-power-to-noise ratio, or any other quantity that can be used to estimate the quality of the positioning symbol of interest on this OFDM symbol Channel main tap: this is the tap with the maximum power between the different taps of the channel region (see below for the definition of channel region)

Delay estimate: this is the RSTD estimate obtained from the PDP in question.

Figure 7A:
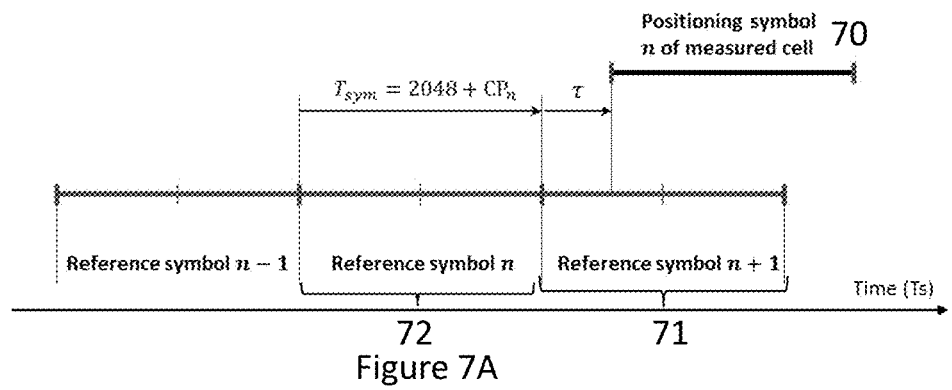
FIG. 7A illustrates the location of positioning symbol n.
Figure 7B:
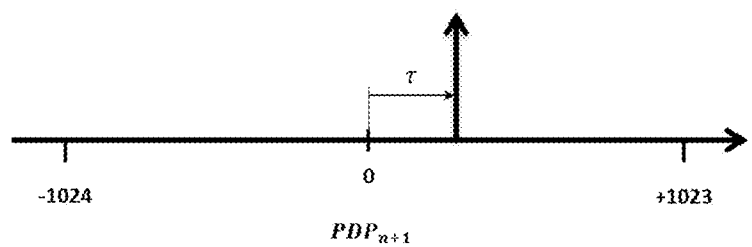
FIG. 7B illustrates the main tap in the PDP obtained from reference symbol n+1.

Turning to the example as shown in FIG. 7 to illustrate the main tap and delay estimate, assuming that the positioning symbol n of the measured cell is located at position 70 as shown in FIG. 7A where it is in a delay of τ with respect to reference symbol n+1 (71). Assuming a one-tap channel, the PDP computed from reference symbol n+1 will show the channel tap at position τ as shown in FIG. 7B. This channel tap is the main tap, and τ is the main tap delay obtained from the $PDP_{n+1}$. However for the delay estimate, we need to take into account the fact that there is a delay of one symbol between the reference symbol n and the reference symbol n+1. This symbol delay is $T_{sym}=2048+CP_n$ where $CP_n$ is the size of the cyclic prefix of symbol n. Therefore, the delay estimate obtained from $PDP_{n+1}$, say $\hat{d}_{n+1}$, will be $$\hat{d}_{n+1}=(2048+CP_A)+\tau.$$

So, let us denote by:

$\mu_0$, $\tau_0$, $\hat{d}_0$: channel metric, main tap delay, and delay estimate obtained from the main PDP respectively.

$\mu_{-1}$, $\tau_{-1}$, $\hat{d}_{-1}$: channel metric, main tap delay, and delay estimate obtained from the preceding PDP respectively.

$\mu_{+1}$, $\tau_{+1}$, $\hat{d}_{+1}$: channel metric, main tap delay, and delay estimate obtained from the succeeding PDP respectively.

Channel Metric and Channel Main Tap Estimation:

For a given PDP, let N be the number of its taps. N is essentially the size of the IFFT used for frequency-domain to time-domain transform.

Denote:

$\{p_k, k=0, \ldots, N-1\}$: is defined as the set of tap powers of the PDP.

$\{d_k, k=0, \ldots, N-1\}$: is defined as the set of tap delays of the PDP.

When $0<l\leq N$ and $0\leq i<N$, we define:

$R_i(l) \stackrel{def}{=} \{(i+k) \bmod N, k=0, \ldots, l-1\}$.

Here, the window $R_i(l)$ is a candidate channel region, the index l stands for the length of this candidate channel region and the index i for its position inside the PDP (see section "control parameters" below for additional information).

Then, $P_i(l) \stackrel{def}{=} \Sigma_{j \in R_i(l)} p_j$: is defined as the power of $R_i(l)$.

$w \stackrel{def}{=} \arg \max_{j \in R_i(l)} \{P_j\}$: is defined as the main tap of $R_i(l)$.

From the above notation, an estimate of the channel region with length l of a given PDP, say Λ, is determined as:

$$\Lambda = R_j(l)|j = \arg\max_{i=0,\ldots,N-1}\{P_i(l)\}, \text{ given } l$$

Then,

The channel power is the power of Λ.

The channel main tap is the main tap of Λ. Its delay is $\tau = d_w$.

Coherence Testing and Ambiguity Correction

Coherence testing checks the coherence between the estimates obtained from the main, the preceding, and the succeeding PDPs to detect ambiguity.

The below describes ambiguity resolution when symbol combination is used (when symbol combination is not used, the metric estimation on each PDP is the same but coherent testing on the estimated metrics to detect ambiguity and the actual ambiguity correcting should be adapted as would be understood):

Application of Ambiguity Correction when Symbol Combination is Applied and the Main PDP is a Non-Combined PDP.

The case where a non-combined PDP is selected as the main PDP statistically occurs in situations where the signal to be measured is nearly aligned with the FFT window (in the examples herein the size of the FFT window is $2048T_s$) used to generate this main PDP. Actually, for high delays (typically higher than +/−400 Ts), the measured signal will have significant overlap with two consecutive OFDM symbols and there is a high probability that the corresponding combined PDP will be selected as the main PDP.

Thus, in the case of main PDP being a non-combined PDP, we can make the assumption that there is no significant overlap, and consider that the estimated timing does not require any ambiguity correction.

Application of Ambiguity Correction when Symbol Combination is Applied and the Main PDP is a Combined PDP.

First, following the previous section, we can add a pre-processing stage where, if the signal to be measured is nearly aligned with the FFT window used for PDP computation, the timing measure is carried out on the corresponding non-combined PDP and the ambiguity resolution described below is optional.

This occurs typically when the measured delay is in a neighborhood of symbol time, i.e. in the case where the measured delay is close to either 0 or 2047. This can be expressed as $\min(\tau_0, 2047-\tau_0)<\xi$. The value of is configurable, and can be typically equal to a few hundreds of $T_s$, e.g. $400T_s$.

Figure 8A:
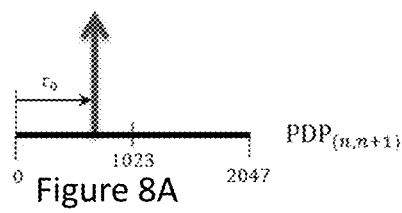
FIGS. 8A and 8B illustrate ambiguity due to wrapping positive delay.

In the case where the delay is, for example, more than $400T_s$, the procedure below may be applied to remove the ambiguity. It follows that, the main tap delay obtained from the main PDP is $\tau_0 \in [0T_s, 2047T_s]$ as the main PDP is a combining PDP. An ambiguity in $\tau_0$ will result in ambiguity of the delay estimate $\hat{d}_0$. We examine $\tau_0$ for the two following cases:

Case 1:

When $\tau_0 \in [0,1023]$ as shown in FIG. 8A

Figure 8B:
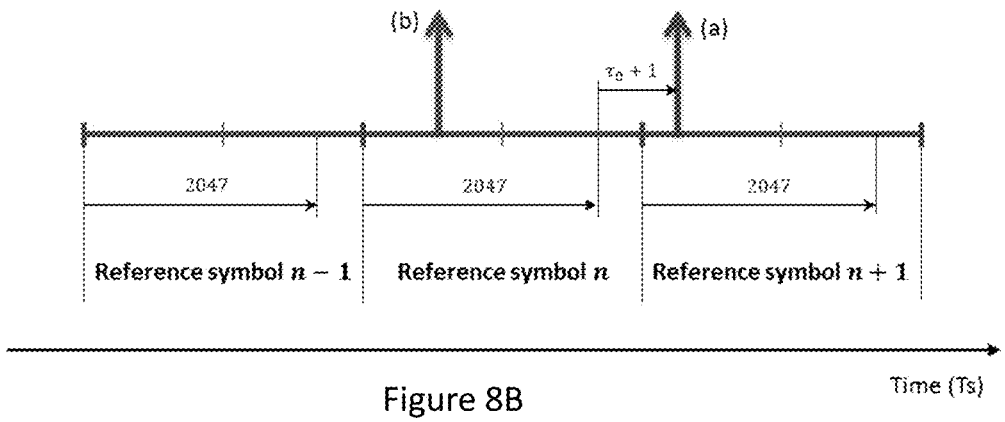

This main tap can correspond to two possibilities as shown in FIG. 8B. If the real channel tap is positioned as in FIG. 8B (case A), we detect a timing of $\tau_0$ whereas the real timing is $2047+\tau_0+1$, so that the delay estimate $\hat{d}_0$ will contain an ambiguity error of $2047+\tau_0+1-\tau_0=2048$ Ts.

It means that this ambiguity should be corrected as $$\hat{d}_0 := \hat{d}_0 + 2048. \quad (1)$$

This is a correction of adding a delay equivalent to the FFT window size and can be generically thought of as such.

The point here is that this correction must not be applied if the real channel tap is positioned as in FIG. 8B (case B). The two following coherence testing conditions allow the detection of case (a) or case (b):

Firstly, as previously described, the succeeding PDP is the original $PDP_{n+1}$ obtained from the reference OFDM symbol n+1. Its delay estimate $\hat{d}_{+1}$ is taken for case A. Thus, it is easy to verify that $\hat{d}_{+1}=\hat{d}_0+2048$.

For the fact that channel may change over OFDM symbols, this condition can be re-expressed as $$|\hat{d}_0+2048-\hat{d}_{-1}|\leq\varepsilon \qquad (2)$$

where $\varepsilon\geq 0$ is a configurable matching threshold. A possible value for $\varepsilon$ is 72 Ts (half the size of the CP).

Secondly, the channel tap for case A implies that reference OFDM symbol n+1 should contain the positioning symbol of the measured cell whereas reference OFDM symbol n should not. Thus, the channel metric measured on the succeeding PDP, $\mu_{+1}$, should be better than that measured on the preceding PDP, $\mu_{-1}$. This is expressible as $$\alpha(\mu_0-\mu_{+1})<(\mu_0-\mu_{-1}), \qquad (3)$$

where $\alpha\geq 1$ is a configurable threshold to compensate the effect of noise. A possible value for $\alpha$ is 1.5, which provides good results in the tested configurations.

That is the difference between the main PDP channel metric and the preceding PDP channel metric divided by the difference between main PDP channel metric and succeeding PDP channel metric being higher than $\alpha$.

Generically, (3) could be the result of a two variable function having channel metric of preceding PDP as a first argument and channel metric of succeeding PDP as a second argument being higher than $\alpha$.

Thus, correction (1) shall be applied when detecting conditions (2) and (3) hold.

We refer to the subsequent section for how to choose the involving parameters.

Figure 9A:
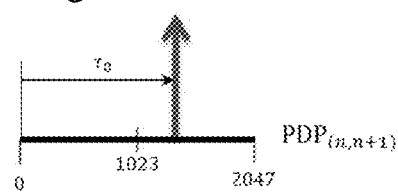
FIGS. 9A and 9B illustrate ambiguity due to wrapping negative delay.

Case 2:

When $\tau_0\in[1024, 2047]$ as shown in FIG. 9A

Figure 9B:
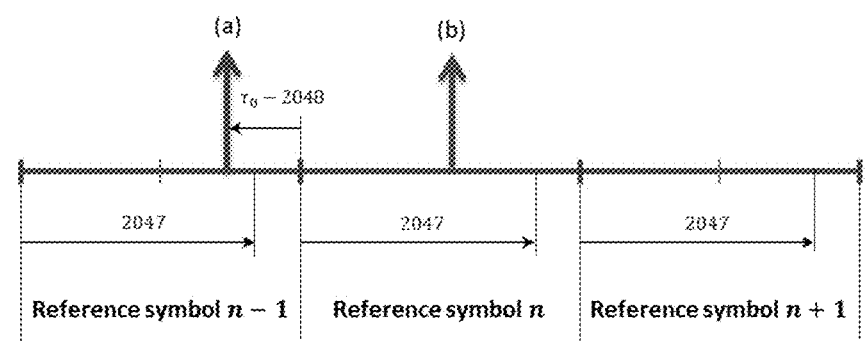

The channel tap can correspond to two possibilities as shown in FIG. 9B where the delay estimate $\hat{d}_0$ will contain an ambiguity error if the real channel tap is at position (a). The ambiguity error is $$\tau_0-(\tau_0-2048)=2048 \, Ts.$$

Thus, the delay estimate $\hat{d}_0$ should be corrected as $$\hat{d}_0:=\hat{d}_0-2048. \qquad (4)$$

This is a correction of subtracting a delay equivalent to the FFT window size and can be generically thought of as such.

Similar to the cases of FIG. 7, this correction must not be applied when the real channel tap is position as in FIG. 9B (case b). Detecting this ambiguity can be detected by using the following coherent testing conditions:

Firstly, the preceding PDP is the original PDP obtained from DLP symbol n. Its delay estimate $\hat{d}_{-1}$ is taken at position (a), resulting in $$\hat{d}_{-1}=d_0-2048.$$

To take into account channel variation over OFDM symbols, this condition can be re-expressed as $$|\hat{d}_0-2048-\hat{d}_{-1}|\leq\varepsilon. \qquad (5)$$

Secondly, channel tap at position of case A of FIG. 9B implies that DLP symbol n contains the positioning symbol of the measured cell while DLP symbol n+1 does not. As a consequence, channel metric measured on the preceding PDP should be better than that measured on the succeeding PDP, expressible as $$\alpha(\mu_0-\mu_{-1})<(\mu_0-\mu_{+1}). \qquad (6)$$

That is the difference between the main PDP channel metric and succeeding PDP channel metric divided by the difference between main PDP channel metric and preceding PDP channel metric being higher than $\alpha$.

Generically, (6) could be the result of a two variable function having channel metric of the succeeding PDP as a first argument and channel metric of the preceding PDP as a second argument being higher than $\alpha$.

Thus, ambiguity correction (4) shall be applied when detecting conditions (5) and (6) hold.

Control Parameter Options

The described methods use three parameters:

Channel region length, $l\geq 1$

Matching threshold, $\varepsilon\geq 0$

Metric coefficient, $\alpha\geq 1$.

While the proposed method remains flexible for parameter setting, guidelines are provided for the configuration of these parameters.

Although the channel length l should be proportional to the channel delay spread, evaluation over different channel types has shown that l=3 in 512 IFFT basis is an efficient tradeoff for all channels. Preferably, l is tuned to the exact delay spread of the channel since this measures the width of the window containing the useful signal. Therefore, preferably, l is equal to one tap for single tap channel and the value of l is increased to values greater than 3 for wider channels. In practice, using the same value l=3 for all channels provides a good tradeoff.

Matching threshold is aimed at taking into account channel variation over symbols, as well as possible imperfection of the channel tap estimation. Evaluation has shown that the proposed method is not sensitive to $\varepsilon$ (where we recall that $\varepsilon\geq 0$ is the configurable matching threshold, see above). One can set $\varepsilon$ to some tens of Ts, even to one hundred Ts.

Metric coefficient $\alpha$ is used to take into account the effect of noise. However, the comparison of relative channel metrics as proposed in Eq (3) and Eq (6) has been shown to be significantly robust against simulated signal-power-to-noise ratio (SNR) over different channels. Setting $\alpha=1.5$ gives the best performance tradeoff over different scenarios.

Performance Gain

Figure 10:
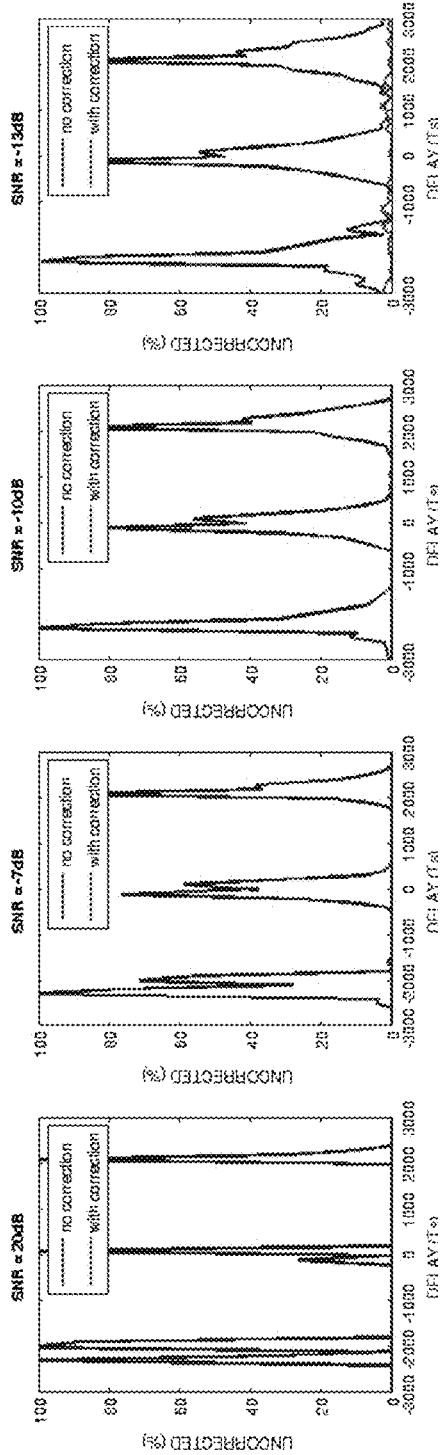
FIG. 10 illustrates performance gain with AWGN of embodiments.
Figure 11:
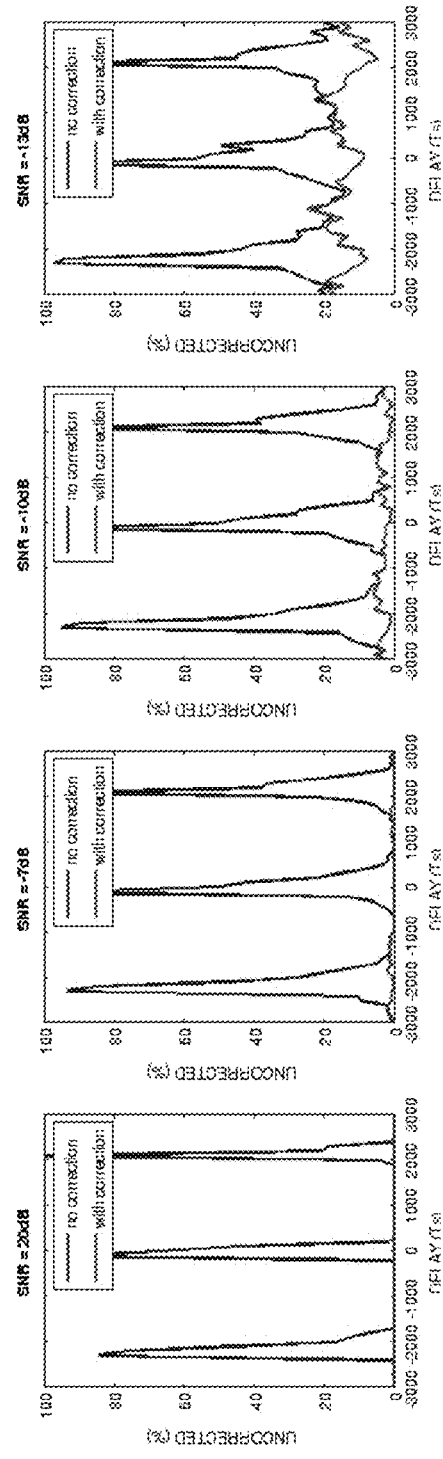
FIG. 11 illustrates performance gain with EPA5 of embodiments.
Figure 12:
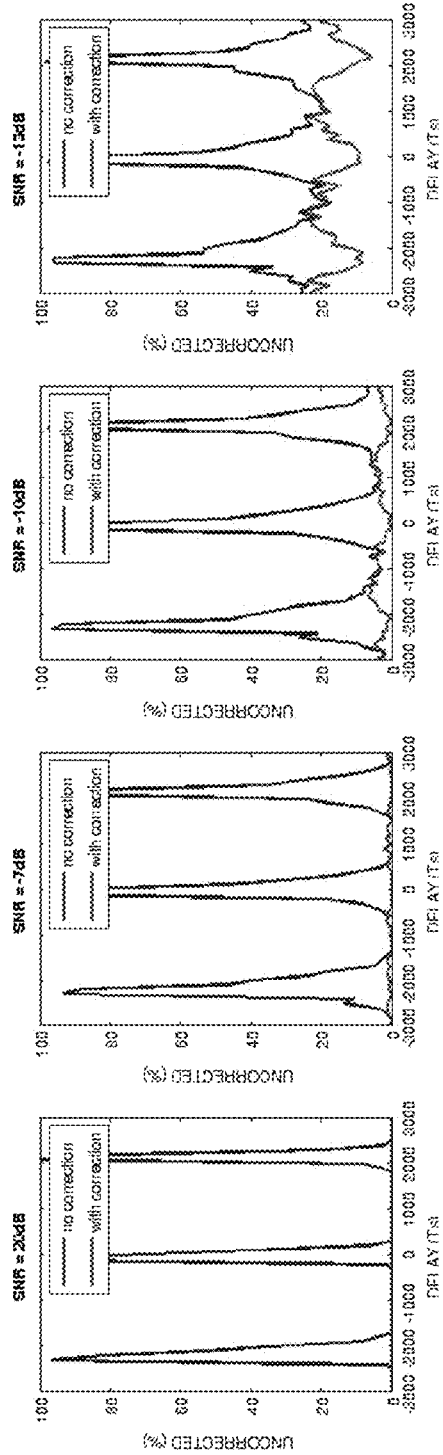
FIG. 12 illustrates performance gain with EVA70 of embodiments.
Figure 13:
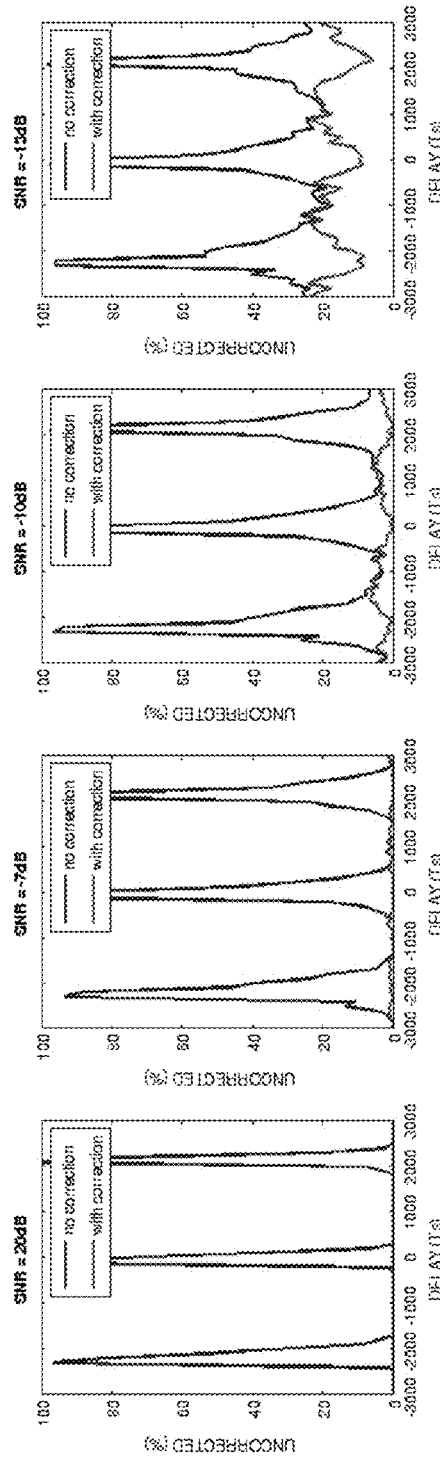
FIG. 13 illustrates performance gain with ETU3 of embodiments.

The proposed ambiguity resolution method with the parameter setting described above has been challenged over different scenarios and its performance is shown for Additive White Gaussian Noise (AWGN) in FIG. 10, Extended Pedestrian A5 (EPA5) in FIG. 11, Extended Vehicular A70 (EVA70) in FIG. 12, and Extended Typical Urban30 (ETU30) in FIG. 13 respectively. These channels are defined in annex B2 of 3GPP contribution 36.101 and correspond to classical multipath fading propagation conditions tested in LTE. Also, coherent combination of frequency-domain data is used.

These evaluation scenarios have been set for the most challenging configuration with the maximum uncertainty window of [−3×1023, +3×1023] Ts, and input RSTD varying from −3000 Ts to 3000 Ts. This case is the most challenging one because it corresponds to the maximum parameter values authorized by the LTE standard.

In addition, the SNR of the measured cell was set as low as −13 dB. The performance was evaluated as the percentage of remaining RSTD measures that contain ambiguity.

The evaluation results show that the proposed ambiguity resolution method enables frequency-domain implementation to work over a wide range of delay and of uncertainty. In each graph of FIGS. 10, 11, 12 and 13, the top line is with no correction and the bottom line is with the correction applied.

As discussed previously, the methodology disclosed herein provides benefits of:

Robustness against channel conditions

An implementation that is independent of the underlying frequency-implementation Low complexity and processing overhead.

The various embodiments described above may be implemented by a computer program product. The computer program product may include computer code arranged to instruct a computer (processor) to perform the functions of one or more of the various methods described above. The computer program and/or the code for performing such embodiments may be provided to an apparatus, such as a computer (processor), on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer (processor) may be configured in accordance with such code to perform one or more processes in accordance with the various embodiments discussed herein.

The invention claimed is:

1. A computer implemented method of providing reference signal time difference (RSTD) data comprising:
   receiving an uncertainty window centered around an expected RSTD value;
   determining a power-delay profile (PDP) of each reference orthogonal frequency division multiplexing (OFDM) symbol within the uncertainty window;
   calculating a parameter indicative of signal quality for each determined PDP, and obtaining a main PDP having the highest signal quality;
   obtaining a preceding PDP of the main PDP;
   obtaining a succeeding PDP of the main PDP;
   determining PDP metrics comprising:
      determining a channel metric for each of the main, preceding and succeeding PDPs;
      determining a channel main tap for each of the main, preceding and succeeding PDPs;
      determining a delay estimate for each of the main, preceding and succeeding PDPs; and
   wherein if the main PDP is a combined PDP, wherein a combined PDP is determined from a plurality of reference OFDM symbols, performing coherence testing on the PDP metrics to detect any ambiguity in the delay estimate of the main PDP, and correcting any ambiguity.

2. The method of claim 1 wherein the signal quality is indicative of whether a respective reference OFDM symbol contains positioning data of a measured cell.

3. The method of claim 1 wherein the PDPs comprise combined PDPs.

4. The method of claim 1 wherein combined PDPs are obtained by at least one of:
   coherently combining frequency-domain data; or
   combining two data sets output from an inverse fast Fourier Transform (IFFT) of each reference OFDM symbol by complex value combination or power combination.

5. The method of claim 1 wherein if the main PDP is a combined PDP, coherence testing is performed on the PDP metrics and delays to detect any ambiguity in delay estimate of the main PDP, and any ambiguity is corrected.

6. The method of claim 1 wherein the PDPs are calculated from at least one of:
   a positioning symbol;
   a positioning subframe;
   a predetermined positioning frame;
   a positioning occasion.

7. The method of claim 1 wherein ambiguity is corrected by adding a fast Fourier transform (FFT) size delay to the delay estimate of the main PDP if:
   the delay estimate of the main PDP plus the FFT size delay minus the delay estimate of the succeeding PDP is less than or equal to a matching threshold, where the value to be compared to the matching threshold is taken as an absolute value; and
   the result of a two variable function having channel metric of the preceding PDP as a first argument and channel metric of the succeeding PDP as a second argument is higher than a second threshold.

8. The method of claim 1 wherein ambiguity is corrected by subtracting an FFT size delay from the delay estimate of the main PDP if:
   the delay estimate of the main PDP minus the FFT size delay minus the delay estimate of the preceding PDP is less than or equal to a matching threshold, where the value to be compared to the threshold is taken as an absolute value; and
   the result of a two variable function having channel metric of the succeeding PDP as a first argument and channel metric of the preceding PDP as a second argument is higher than a second threshold.

9. The method of claim 1 wherein the RSTD is measured using a position reference signal (PRS).

10. The method of claim 1 wherein the uncertainty window is longer than the FFT window used for frequency domain processing.

11. The method of claim 1 wherein correlation with an incoming pilot sequence is executed in the frequency domain.

12. The method of claim 1 further comprising determining a set of consecutive FFT windows for processing in the frequency domain.

13. The method of claim 1 further comprising determining an RSTD estimate based on the delay estimate of the main PDP.

14. An apparatus comprising a processor arranged to carry out the method of claim 1.

15. A non-transitory computer readable medium comprising instructions that when executed cause a processor to carry out the method of claim 1.

* * * * *